(12) United States Patent  (10) Patent No.: US 7,497,153 B2
Brunton  (45) Date of Patent: Mar. 3, 2009

(54) CUTTING TOOL AND METHOD OF USE

(75) Inventor: Greg Brunton, Rosehill (AU)

(73) Assignee: James Hardie International Finance B.V., Amsterdam (NL)

( * ) Notice: Subject to any disclaimer, the term of this patent is extended or adjusted under 35 U.S.C. 154(b) by 27 days.

(21) Appl. No.: 10/984,440

(22) Filed: Nov. 8, 2004

(65) Prior Publication Data

US 2005/0126357 A1    Jun. 16, 2005

(30) Foreign Application Priority Data

Nov. 7, 2003   (AU) ............... 2003906177

(51) Int. Cl.
B26D 7/08  (2006.01)
(52) U.S. Cl. ............... 83/15; 83/169; 83/854; 407/11; 409/136; 451/259; 451/449
(58) Field of Classification Search ......... 409/131, 409/132, 136; 407/11, 12, 29.13; 83/15, 83/168, 169, 171, 854; 451/259, 449
See application file for complete search history.

(56) References Cited

U.S. PATENT DOCUMENTS

| | | | | |
|---|---|---|---|---|
| 927,164 | A * | 7/1909 | Puffer ......................... | 451/450 |
| 960,526 | A * | 6/1910 | Erlandsen ................... | 407/11 |
| 2,080,401 | A * | 5/1937 | Heard ......................... | 407/11 |
| 2,524,232 | A * | 10/1950 | Onsrud ....................... | 407/11 |
| 2,527,762 | A * | 10/1950 | Pratt .......................... | 451/488 |
| 2,678,487 | A * | 5/1954 | Onsrud ....................... | 407/36 |
| 2,819,568 | A * | 1/1958 | Kasick ........................ | 451/488 |
| 3,196,584 | A * | 7/1965 | Tatko .......................... | 451/541 |
| 3,282,263 | A * | 11/1966 | Christensen et al. ......... | 125/15 |
| 3,579,928 | A * | 5/1971 | Held ........................... | 451/488 |
| 3,597,817 | A * | 8/1971 | Whalley ...................... | 407/11 |
| 3,628,292 | A * | 12/1971 | Rue ............................ | 451/541 |
| 3,754,359 | A * | 8/1973 | Scandaletos ................ | 451/488 |
| 3,777,443 | A * | 12/1973 | Shaw .......................... | 451/543 |
| 3,916,579 | A * | 11/1975 | Waller et al. ................ | 451/547 |
| 4,333,371 | A | 6/1982 | Matsuda | |
| 4,516,560 | A * | 5/1985 | Cruickshank et al. ........ | 125/15 |
| 4,624,237 | A * | 11/1986 | Inoue .......................... | 125/15 |
| 4,705,435 | A * | 11/1987 | Christoffel .................. | 408/59 |
| 4,870,946 | A | 10/1989 | Long et al. | |
| 5,040,341 | A | 8/1991 | Okinaga | |
| 5,076,024 | A * | 12/1991 | Akagawa et al. ............ | 451/550 |

(Continued)

FOREIGN PATENT DOCUMENTS

DE    30 02 331 A1    9/1980

(Continued)

Primary Examiner—David P Bryant
Assistant Examiner—Eric A Gates
(74) Attorney, Agent, or Firm—Gardere Wynne Sewell, LLP

(57) ABSTRACT

The cutting tool shown generally as 1, has a disc with a peripheral cutting face. In this embodiment the cutting face includes an array of eight circumferentially spaced teeth 2. An open circumferential gutter 5 is located inboard of the teeth and is recessed into a lateral face of the disc. Fluid in the gutter drains into the passageways through the respective inlets under the apparent force due to rotation. A fluid passageway 9 runs between the gutter and the base of the each tooth. The fluid is thereby forced through the passageway and out of outlet 11.

18 Claims, 2 Drawing Sheets

U.S. PATENT DOCUMENTS

| | | | |
|---|---|---|---|
| 5,290,135 A * | 3/1994 | Ball et al. .................... | 407/11 |
| 5,411,010 A * | 5/1995 | Mummenhoff .............. | 125/15 |
| 5,423,717 A * | 6/1995 | Boaz .......................... | 451/449 |
| 5,479,911 A | 1/1996 | Levinson et al. | |
| 5,582,540 A * | 12/1996 | Su et al. .................... | 451/259 |
| 5,674,116 A * | 10/1997 | Merrill et al. ............... | 451/292 |
| 5,846,125 A * | 12/1998 | Robichon ................... | 451/450 |
| 6,688,206 B1 * | 2/2004 | Mummenhoff .............. | 83/676 |
| 2006/0288991 A1 * | 12/2006 | Baratta ..................... | 125/13.01 |
| 2006/0288993 A1 * | 12/2006 | Baratta ..................... | 125/13.01 |
| 2007/0237588 A1 * | 10/2007 | Russell ...................... | 407/11 |

FOREIGN PATENT DOCUMENTS

| | | |
|---|---|---|
| DE | 33 15911 A1 | 11/1984 |
| DE | 101 03 435 A1 | 8/2002 |
| EP | 0 826 461 B1 | 3/1998 |
| GB | 2 122 534 A | 1/1984 |
| SU | 1507578 A1 | 9/1989 |

* cited by examiner

CUTTING TOOL AND METHOD OF USE

PRIORITY INFORMATION

This application claims priority to Australian Application No. 2003906177, filed Nov. 7, 2003, the entirety of which is hereby incorporated by reference.

BACKGROUND OF THE INVENTION

1. Field of the Invention

Embodiments of the present invention relate generally to cutting tools, and more particularly to rotating, fluid lubricated cutting tools.

2. Description of the Related Art

As with many building materials, fibre reinforced concrete (FRC) sheeting and piping is cut using a high speed rotating blade cutter. Spinning at high rpm, the disc has a number of peripheral teeth which steadily remove slices of material as the spinning disc is advanced along a cutting path.

One problem with this method is the high levels of friction and stress at the interface between the teeth and material being cut. The high friction causes very high temperatures and wear rates on the teeth. Consequently, the teeth need to be sharpened regularly; a process that adds cost, increases downtime and ultimately reduces tool life. One method of reducing wear of the tool is to make or coat the teeth with tungsten carbide, ceramic or polycrystalline diamond. While these methods do reduce the wear rate on the tool, the special materials are expensive at the outset and more difficult to overhaul.

Another problem with cutting FRC is that the cellulose fibre in the brittle matrix can be difficult to cut. This is due to the fibre "fluffing up" and creating swarf.

One method used to overcome these problems is to apply a fluid to the material being cut. This reduces temperature, and friction and thus tooth wear, as well as keeping dust generation low. Such fluid application is commonly used when cutting metals concrete and stone however is not readily applied to FRC. This is because FRC will readily absorb any fluid and distort.

It is an object of the preferred embodiments of the present invention to overcome or ameliorate one or more of these disadvantages of prior art, or at least to provide a useful alternative.

SUMMARY OF THE INVENTION

Preferred embodiments of the invention have been developed primarily for use in cutting fibre reinforced concrete (FRC) sheet and pipe with a rotating disc cutter, and embodiments will be described predominantly with reference to this application. It will be appreciated, however, that the invention is not limited to this particular field of use, being also applicable to other cutting applications and materials.

In a first embodiment, a cutting tool is provided, comprising:
 a disc having a peripheral cutting or grinding face;
 a circumferential gutter formed in a lateral face of the disc inboard of the cutting face; and
 a fluid passageway having an inlet in fluid communication with the gutter and an outlet at or adjacent the cutting face;
 wherein said gutter and passageway are disposed such that during operation, fluid directed onto the lateral face is caused by rotation of the disc to migrate outwardly into the gutter, and then through the passageway to the outlet for lubrication at the cutting face.

Preferably, the tool includes a plurality of cutting teeth in a circumferentially spaced array on the periphery of the disc. Preferably, each tooth extends generally radially to a distal cutting edge. Preferably, each tooth includes an undercut section disposed inwardly of and immediately behind the corresponding edge.

Preferably, the disc includes a plurality of said passageways, the outlets of which direct the fluid to the undercut sections of respective teeth.

In another embodiment, a method of cutting a material is provided. The method comprises:
 providing a cutting tool comprising a disc having a peripheral cutting or grinding face, a circumferential gutter formed in a lateral face of the disc inboard of the cutting face, and a fluid passageway having an inlet in fluid communication with the gutter and an outlet at or adjacent the cutting face;
 rotating the disc at a desired operational speed;
 directing fluid to the gutter, said fluid migrating outwardly into the gutter caused by rotation of the disc; and
 directing fluid into the passageway to the outlet for lubrication at the cutting face.

BRIEF DESCRIPTION OF THE DRAWINGS

A preferred embodiment of the invention will now be described, by way of example only, with reference to the accompanying drawings in which.

DETAILED DESCRIPTION OF THE PREFERRED EMBODIMENTS

Figure 1:
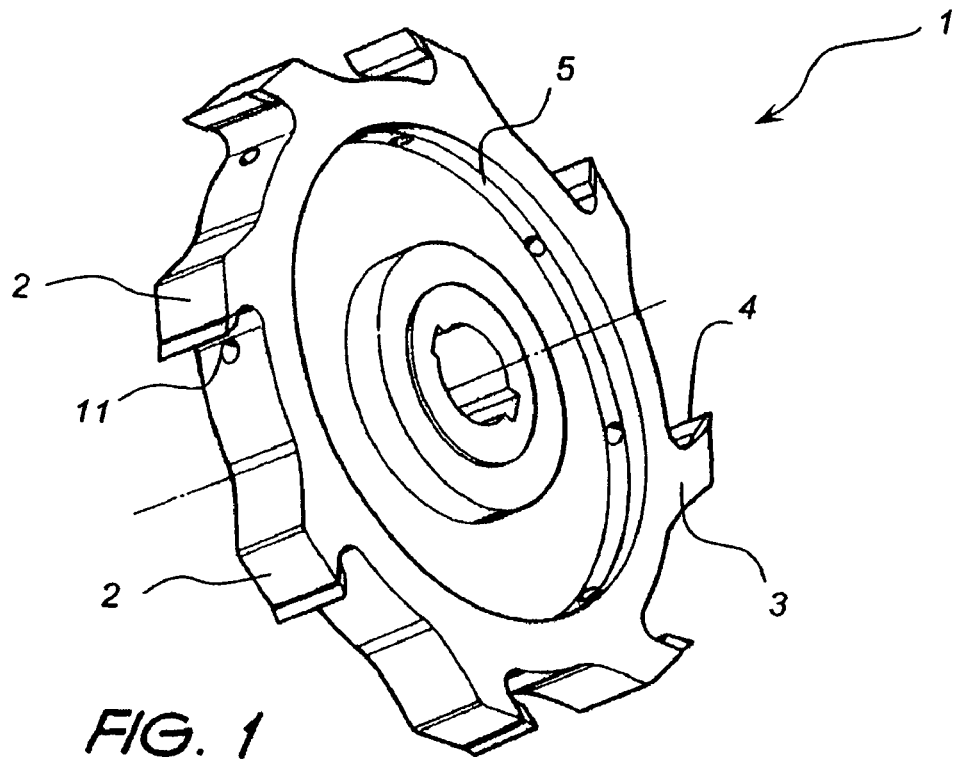
FIG. 1 is a perspective view of a cutting tool in accordance with the invention.
Figure 2:
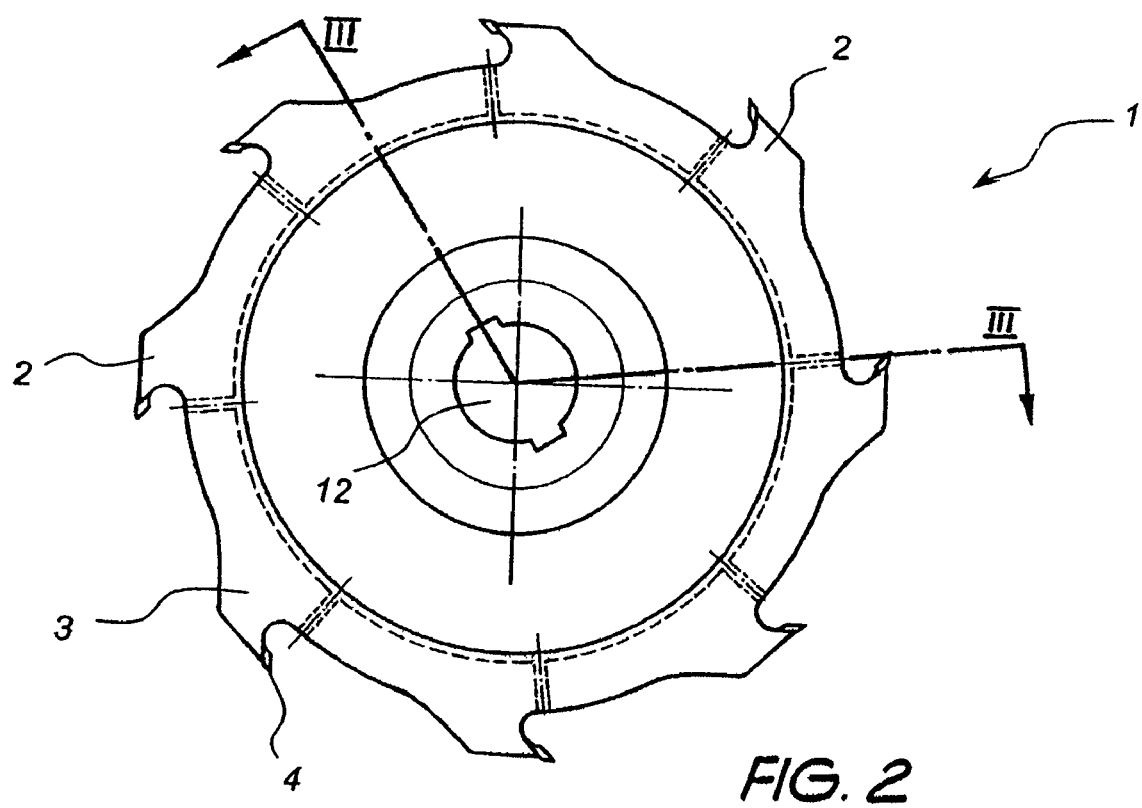
FIG. 2 is front view of the apparatus shown in FIG. 1.

Referring to the drawings, the cutting tool shown generally as 1, has a disc with a peripheral cutting face. In this embodiment the cutting face includes an array of eight circumferentially spaced teeth 2 for slicing through Fibre Reinforced Concrete (FRC). Each tooth has a wide base 3 at the periphery of the disc and terminates at cutting edge 4.

The term "cutting" is used herein to describe a number of operations to which the tool of the preferred embodiments may be configured to perform. For instance the disc may be use to slice, route, plane, grind, buff or polish. Accordingly, the cutting face may include any number of teeth shaped to a specific task or grinding or polishing surfaces, without departing from the scope of the invention. These embodiments might also be applied to a tool for performing any of the above operations to any number of base materials, for instance, metal, stone, ceramics, concrete, composites or timber.

Figure 3:
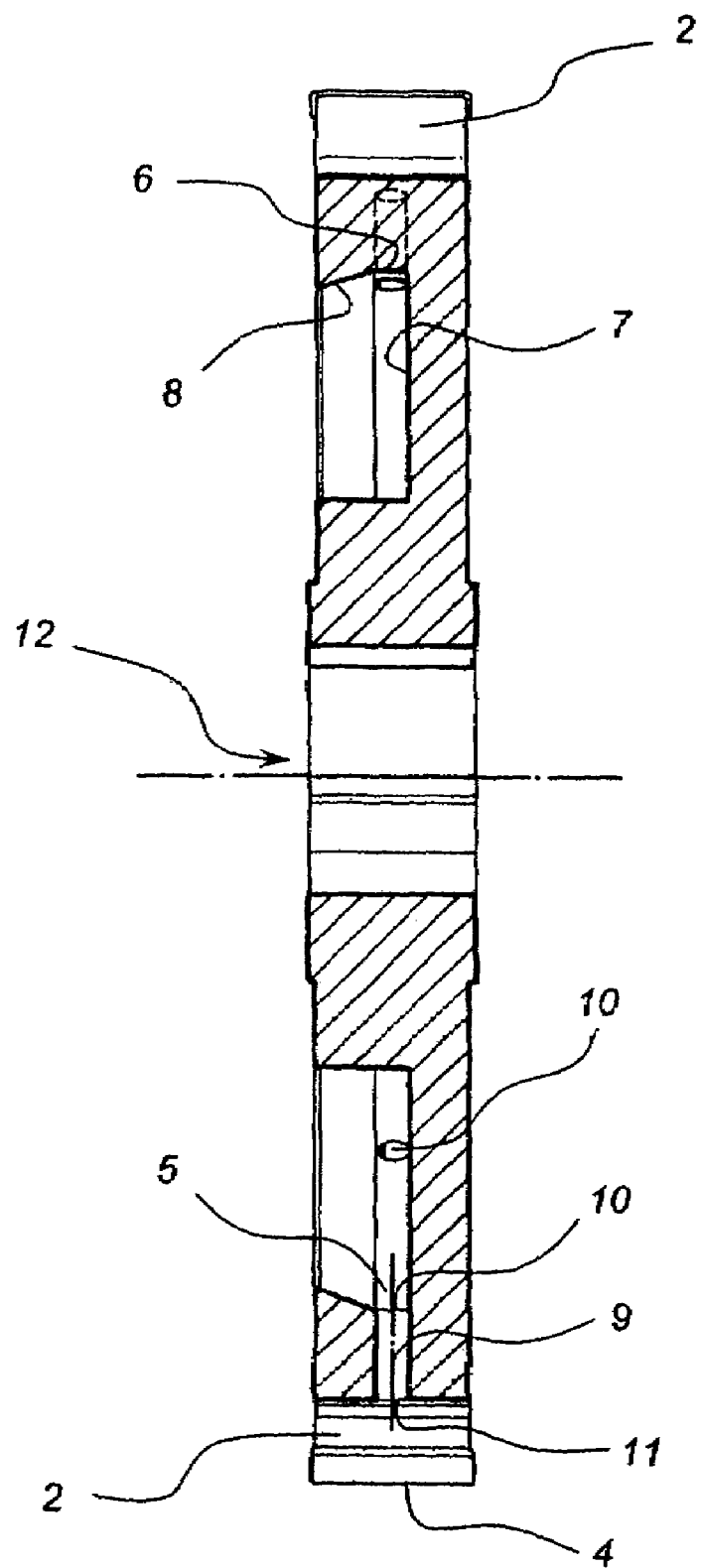
FIG. 3 is a sectional side view of the apparatus shown in FIG. 2 taken along the section line III-III.

An open circumferential gutter 5 is located inboard of the teeth and is recessed into a lateral face of the disc. Referring to FIG. 3, in cross section, the gutter is defined by bottom 6, back wall 7 and a lip 8, formed integrally with the disc.

A fluid passageway 9 runs between the gutter and the base of the each tooth. Each passageway has an inlet 10 in the gutter bottom and an outlet 11 at or adjacent the base 3 in an undercut section of the respective tooth. In this embodiment each passageway 9 is disposed to run substantially radially from its inlet in the gutter 5 to the outlet 11 at the base of the respective tooth 2. In alternative embodiments the outlet may be located at any position in the periphery of the tool, to optimise efficiency and/or performance in terms of cooling, lubrication and/or finishing as appropriate. In addition, the tool may be configured so that more than 1 passageway is provided per tooth to provide a more even distribution of fluid.

In operation, the tool is attached by means of a central drive aperture 12 to a drive shaft. Commonly, the drive shaft is powered by an electric motor for supplying rotational drive. Once the disc has reached operational speed, cutting may be initiated. At this time a cutting fluid is introduced to the gutter. The fluid may be applied directly into the gutter by one or more fluid supply lines (not shown) or it may be directed onto the lateral face of the disc inboard of the gutter. Either way, since the disc is spinning, it acts as a centrifuge causing the fluid to be distributed substantially evenly around the gutter. In the case where the fluid is directed onto the lateral face, cohesion between the lateral face and the fluid causes the fluid to adhere to the disc before moving into the gutter by the apparent outward force of rotation. The fluid in the gutter is contained by the back wall, gutter lip and outward force due to the rotation. In this way, the disc may be used at virtually any orientation.

Fluid in the gutter drains into the passageways through the respective inlets under the apparent force due to rotation. The fluid is thereby forced through the passageway and out of the outlet. In the present embodiment, the passageway and outlet are configured to act as a nozzle directing fluid onto the cutting edge. The undercut section of each tooth also acts to direct the fluid onto the cutting edge. In this way cutting fluid is directed to the medium being cut right at the point of separation as material is removed.

As such the cutting fluid is directed to where it is needed most, thereby limiting the contact between the cutting fluid and base product. In addition, because the fluid is applied to the product on the removal side most of the product material which does contact with cutting fluid is being removed from the base product. This is particularly advantageous in the case of FRC, which readily absorbs fluid and may cause damage.

It will be appreciated that the preferred embodiment of the invention provides a cutting tool. Methods of using the tool to cut various materials are also encompassed by the present invention. The preferred embodiments enable the materials of cartridges to be recycled quickly, in a cost effective manner. Moreover, particulate concentration in the surrounding air is vastly reduced, eliminating the potential hazards of dust inhalation by workers and the risk of explosion. In all these respects, the preferred embodiments represent practical and commercially significant improvements over the prior art.

Although the invention has been described with reference to specific examples it will be appreciated by those skilled in the art that the invention may be embodied in many other forms.

What is claimed is:

1. A cutting tool, comprising:
   a non-segmented disc having a lateral face and a peripheral edge, wherein only the peripheral edge includes a cutting or grinding face extending therefrom;
   a circumferential gutter formed in a lateral face of the disc inboard of the cutting face;
   and at least one fluid passageway directly communicating the lateral face with the peripheral edge, each fluid passageway having its inlet in the gutter in fluid communication with the gutter and an outlet in the peripheral edge of the disc at or adjacent the cutting face, wherein each inlet and outlet remain in an open configuration;
   wherein said gutter and the at least one fluid passageway are disposed such that during operation, fluid directed onto the lateral face is caused by rotation of the disc to migrate outwardly into the gutter, and through the inlet of the at least one fluid passageway freely through the fluid passageway and then through the outlet at the peripheral edge of the disc for lubrication at the cutting face.

2. The cutting tool according to claim 1 wherein said cutting face includes at least one cutting tooth disposed on the cutting face.

3. The cutting tool according to claim 2 wherein said tooth extends generally radially to a distal cutting edge.

4. The cutting tool according to claim 3 wherein said fluid passageway and outlet are configured to act as a nozzle such that during operation, fluid in the gutter is caused by rotation of the disc to move into the passageway and be directed onto the tooth adjacent the cutting edge.

5. The cutting tool according to claim 3 wherein said fluid passageway and outlet are configured to act as a nozzle such that during operation, fluid in the gutter is caused by rotation of the disc to move into the passageway and be directed onto the tooth at the cutting edge.

6. The cutting tool according to claim 1 wherein the tool includes a plurality of cutting teeth in a circumferentially spaced array on the cutting face.

7. The cutting tool according to claim 6 wherein each tooth includes an undercut section disposed inwardly of and immediately behind the corresponding edge.

8. The cutting tool according to claim 7 wherein the disc includes a plurality of said passageways, the outlets of which direct the fluid to the undercut sections of respective teeth.

9. A method of cutting a material, comprising:
   providing a cutting tool comprising a non-segmented disc having a lateral face and a peripheral edge, wherein only the peripheral edge includes a cutting or grinding face extending therefrom, a circumferential gutter formed in a lateral face of the disc inboard of the cutting face, and at least one fluid passageway providing direct communication between the lateral face and the peripheral edge, each fluid passageway having its inlet in fluid communication with the gutter and an outlet in the cutter peripheral edge at or adjacent the cutting face, wherein each inlet and outlet remain in an open configuration;
   rotating the disc at a desired operational speed;
   directing fluid to the gutter, said fluid migrating outwardly into the gutter caused by rotation of the disc, wherein the fluid migrates directly from the fluid passageway inlet to the outlet at the peripheral edge of the disc for lubrication at the cutting face.

10. The method according to claim 9, wherein said cutting face includes at least one cutting tooth disposed on the cutting face.

11. The method according to claim 10, wherein said tooth extends generally radially to a distal cutting edge.

12. The method according to claim 11, wherein the at least one fluid passageway and outlet are configured to act as a nozzle such that fluid in the gutter is caused by rotation of the disc to move into the fluid passageway and be directed onto the tooth adjacent the cutting edge.

13. The method according to claim 11, wherein the fluid passageway and outlet are configured to act as a nozzle such that fluid in the gutter is caused by rotation of the disc to move into the fluid passageway and be directed onto the tooth at the cutting edge.

14. The method according to claim 9, wherein the tool includes a plurality of cutting teeth in a circumferentially spaced array on the cutting face.

15. The method according to claim 14, wherein each tooth includes an undercut section disposed inwardly of and immediately behind the corresponding edge.

16. The method according to claim 15, wherein the disc includes a plurality of fluid passageways, the outlets of which direct the fluid to the undercut sections of respective teeth.

17. The method according to claim 9, further comprising cutting the material as fluid is directed to the cutting face.

18. The method according to claim 9, wherein the material is fibre reinforced concrete.

* * * * *